July 30, 1957 W. P. FRANKENSTEIN 2,800,999
CARTON
Filed Feb. 14, 1952 5 Sheets-Sheet 1
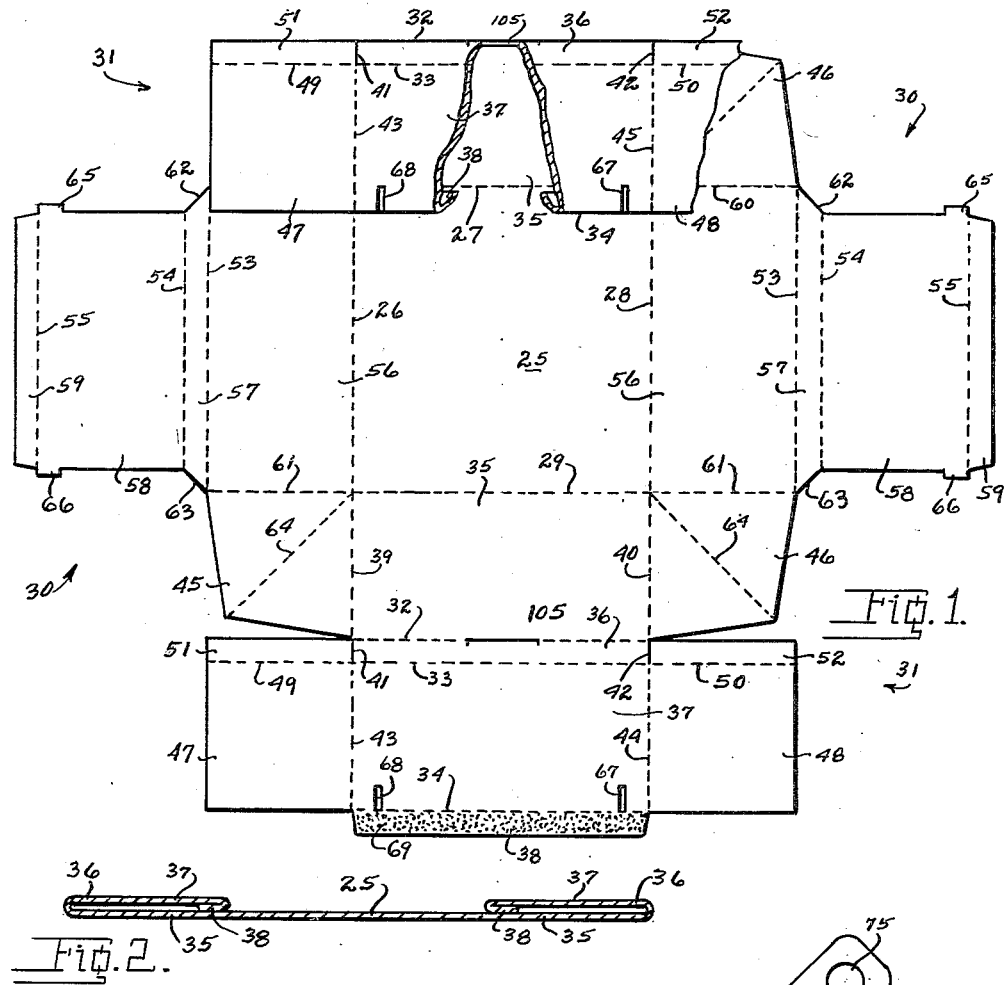
Fig. 1.
Fig. 2.
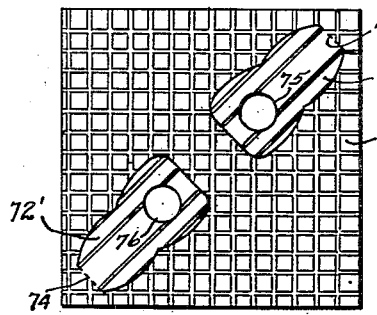
Fig. 5.
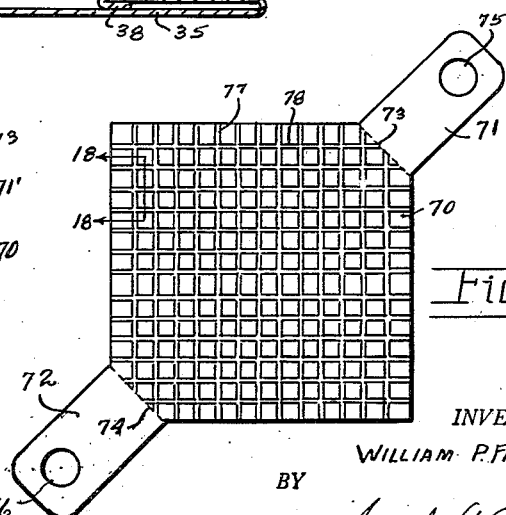
Fig. 4.
INVENTOR.
WILLIAM P. FRANKENSTEIN
BY
Joseph A. Rave
Attorney

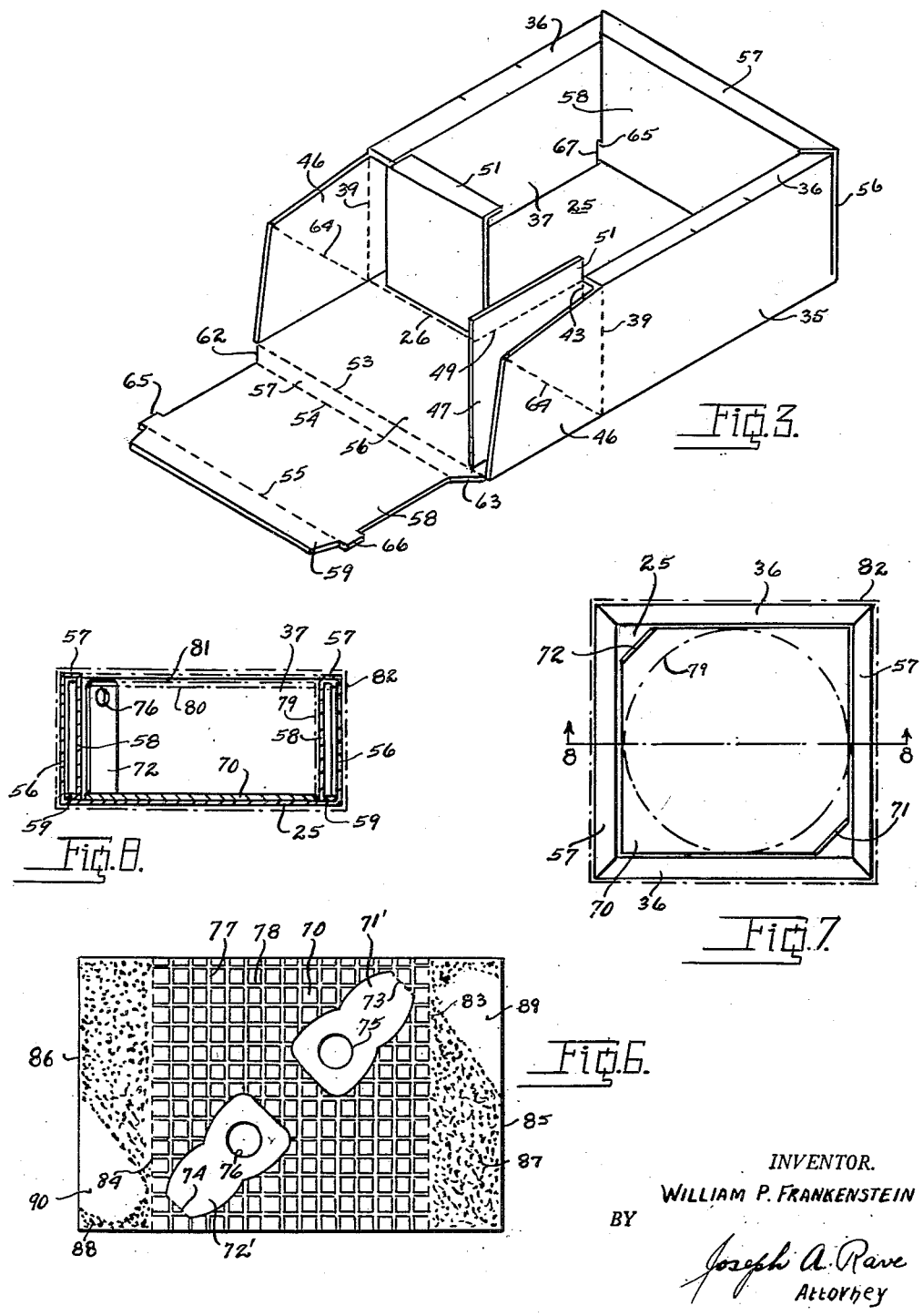

INVENTOR.
WILLIAM P. FRANKENSTEIN,
BY Joseph A. Rave
Attorney

July 30, 1957 W. P. FRANKENSTEIN 2,800,999
CARTON
Filed Feb. 14, 1952 5 Sheets-Sheet 4

INVENTOR.
WILLIAM P. FRANKENSTEIN
BY
Joseph A. Rave
Attorney

July 30, 1957 W. P. FRANKENSTEIN 2,800,999
CARTON
Filed Feb. 14, 1952 5 Sheets-Sheet 5

INVENTOR.
WILLIAM P. FRANKENSTEIN,
BY
Joseph A. Rave
Attorney

United States Patent Office 2,800,999
Patented July 30, 1957

2,800,999

CARTON

William P. Frankenstein, Cincinnati, Ohio

Application February 14, 1952, Serial No. 271,491

5 Claims. (Cl. 206—56)

This invention relates to improvements in packages, particularly to a package or packaging for display and sales of frosted, decorated, iced, or the like cakes.

The packge of the present invention combines, in modified form, elements heretofore substantially known but with the elements so modified as to have usefulness beyond the structures previously employed. The elements of the present invention further cooperate with one another to the point whereby the production of the decorated cakes is materially increased and the finished product in no wise subject to damage or inadvertent mishaps.

In general this invention relates to a decorated cake package in which is employed a four-sided carton or box together with improved means for placing the cake within the carton or box and which means is subsequently utilizable for removing the cake from the box. The mechanism of the present invention permits the removal of a decorated cake, that is a cake provided with a relatively soft topping, icing, or the like, from the box without danger of disturbing the said decorations on the top of the cake.

It is, therefore, the principle object of the present invention to provide an improved decorated cake package and wherein the cake can be readily inserted and removed from a box or carton without damaging the cake or the top decoration thereof.

Another object of this invention is the provision of a cake package, as set forth in the preceding object, which involves substantially known elements that may be economically produced.

Another object of this invention is the provision of a cake support board that may be employed as means for placing the cake in and removing the same from a four-sided box or carton that relatively snugly embraces the cake.

A further object of the invention is the provision of a cake lift or board that cooperates with a box or carton in such a manner as to be entirely or substantially within the limits of the box or carton so that said box or carton may be machine wrapped with a transparent wrapper but which cake lift or board is adapted for removing the cake from its box or carton without damaging either the cake itself or the relatively soft top decoration thereof.

It is a specific object of the present invention to provide a four-sided box or carton together with a cake liner each adapted to cooperate with one another to provide a package for cakes having decorated tops so that the cake can be inserted in and removed from the carton or package without damage to the cake or its decorated top during the insertion and removal of the cake in the box or carton and which box or carton with its enclosed cake may be wrapped in a transparent wrapper, such as cellophane, and in which no interference is afforded by the elements in producing the finished package.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a plan view of a blank, partially folded and partially cut away for clearness of illustration, from which a box or carton forming an element of the present invention may be set up.

Fig. 2 is a transverse sectional view through the blank of Fig. 1 in its knocked down condition as shipped to the user.

Fig. 3 is a perspective view of a partially erected box or carton from the knocked down blank of Fig. 2.

Fig. 4 is a plan view of the cake liner adapted for use in inserting and removing the cake from an erected carton of Fig. 3.

Fig. 5 is a view of a cake liner showing a modification in its structure over Fig. 4.

Fig. 6 is a plan view of a liner similar to the liners of Figs. 4 and 5 showing a further modification in the construction thereof.

Fig. 7 is a top plan view of a box or carton completely erected from the blank of Fig. 2 with the liner mounted therein.

Fig. 8 is a transverse sectional view through an erected carton as seen from line 8—8 on Fig. 7.

Throughout the several views of the drawings similar reference characteristics are employed to denote the view of similar parts.

Figure 10:
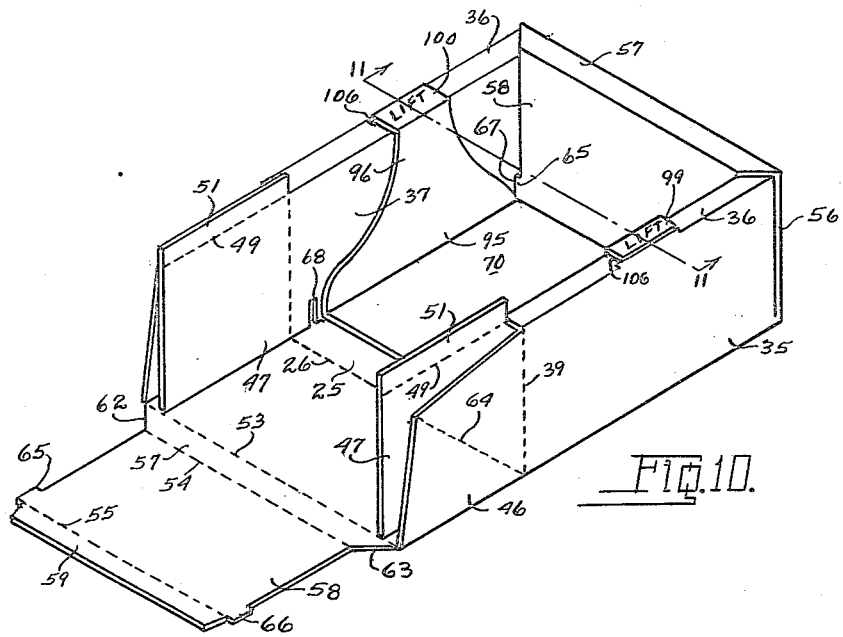
Fig. 10 is a view similar to Fig. 3 showing the box or carton partially erected from the blank of Fig. 2 with the cake liner of Fig. 9 therein.

As was noted above the present invention pertains to a package particularly adapted for use with round and square or rectangular cakes which are provided with a decorated upper surface and wherein the said cake is housed in a box or carton having upstanding sides or walls that relatively closely engage the sides of the cake and whereby the said cake can be readily inserted and removed from the box or carton. The invention further relates to details of construction of the parts which cooperate in producing this package.

Several modifications of the parts of the package are illustrated in the accompanying drawings and which modifications will be described, in detail, successively with the several modifications having only the details whereby they differ from one another specifically pointed out.

Specifically referring to Figs. 1, 2 and 3 the blank there shown forms a four-sided hollow wall box or carton, with said blank having substantially centrally thereof a bottom panel 25 having its edges defined by score or fold lines 26, 27, 28 and 29. For purposes of description the score or fold lines 26 and 28 define the ends of the bottom panel 25 and each integrally hingedly connect with the said bottom panel 25 a substantially identical extension 30 that form end walls, as will be presently described in detail. The score or fold lines 27 and 29 designate the sides of the bottom panel 25 and respectively integrally hingedly connect therewith a substantially identical extension 31 which in the erected carton form side walls, as will presently be described in detail.

Since the side walls extensions 31 are substantially identical it is deemed sufficient that but one of them be described in detail for both side walls. Accordingly, the extension 31 is provided with a plurality of substantially parallel score or fold lines 32, 33 and 34 forming in the said extension between the score or fold line 29 at the end thereof panels 35, 36, 37 and 38. In the erected carton the panel 35 forms the side wall outer wall member and has its ends defined by score or fold lines 39 and 40 which are in substantial alignment with the bottom panel end scores 26 and 28. The panel 36, in the erected carton, forms the side wall top wall member having its ends defined by cut lines 41 and 42 in substantial alignment with the outer wall member end scores 39 and 40. The panel 37 forms in the erected carton the side wall inner wall member having its ends defined by score or fold lines 43 and 44 and the panel 37 has integrally, hingedly, connected thereto through the score or fold line 34 the panel 38 which forms a glue flap for securing the lower end of the panel 37 to the carton bottom 25.

Hingedly connected with the ends of the outer wall member or panel 35 through the score or fold lines 39 and 40 are respectively corner flaps 45 and 46 adapted, as will presently be made clear, to be folded on themselves and disposed transversely of the carton bottom panel 25. The side wall inner wall member 37 has likewise integrally, hingedly, connected therewith through its end score or fold lines 43 and 44 tucking flaps respectively indicated by reference numerals 47 and 48. The upper ends of the tucking flaps 47 and 48 are respectively defined by score or fold lines 49 and 50, respectively integrally hingedly connecting with its tucking flap a spacer flap 51 and 52.

Since the end wall extensions 30 are substantially identical only one of said extensions will be defined in detail which will suffice for both extensions. Accordingly, the extension 30 is provided with a plurality of parallel score or fold lines 53, 54 and 55 providing in said extension adjacent panels 56, 57, 58 and 59. In the erected carton the panel 56 forms the end wall outer wall members having its ends defined by score or fold lines 60 and 61, respectively, in substantial alignment with the carton bottom panel side score or fold lines 27 and 29. In the said end wall the panel 57 forms the end wall top wall member while the panel 58 forms the end wall inner wall member. The panel 58 is of less length than the panel 56 since the panel 58, or end wall inner wall member, is adapted to be disposed between the side walls inner wall members, as will presently be made clear, wherefore, the top wall member or panel 57 has its ends biased or contoured as at 62 and 63 for joining the adjacent ends of the end wall outer wall member or panel 56 with the ends of the outer wall inner wall member or panel 58. The panel 59 in the erected carton constitutes a spacer flap for spacing the lower end of the end wall inner wall member from the lower end of the end wall outer wall member.

The end wall outer wall member has integrally, hingedly, connected therewith, at its opposite ends, through its end scores 60 and 61 the tucking flaps 45 and 46. Each of the tucking flaps 45 and 46 is provided diagonally thereof with a score or fold line 64 through which the said tucking flaps are folded on themselves bellowswise, wherefore, said flaps are referred to as bellows corners. In order to lock the walls in assembled erected positions the each end wall inner wall member or panel 58 is provided laterally of its outermost corners, as seen in Fig. 1, with projecting locking lugs 65 and 66 which cooperate and interengage with locking slits 67 and 68 formed in the side walls inner wall members at points inwardly spaced from the ends thereof as determined by the width of the end wall top wall member 57.

The blank of Fig. 1 after being cut and scored as above pointed out has adhesive 69 applied to its under surface, with the blank as seen in Fig. 1. The glue flaps or panels 38 are then folded on themselves respectively on their score or fold lines 34 to lie superimposed on the side walls inner wall members or panels 37 with the said adhesive 69 then uppermost. The blank is then folded on the score or fold lines 32 for superimposing the side walls top wall members or panels 36 and the side walls inner wall members or panels 37 on the side walls outer wall members or panels 35 and with the glue flaps 38 with their adhesive 69 in face contact with the carton bottom panel 25, as illustrated in Fig. 1 in connection with the upper side wall therein shown. Pressure is now applied to the folded blank for insuring proper adhesion of the parts through the adhesive 69.

The blank is now in the folded position of Fig. 2 and it is in this folded or knocked down position that the blank is shipped to the user.

The user in desiring to set up the box or carton does so by lifting the folded side wall extensions to be normal to the carton bottom panel 25. The raising of the folded side wall extensions automatically arranges said side walls to each have its inner and outer wall member parallel with one another and perpendicular to the bottom panel with the top wall thereof parallel with said bottom panel. The tucking flaps 47 and 48, at one end of the carton are now turned to extend transversely of the carton bottom, whereupon the bellows corners 46, at said end of the carton, are inwardly folded on their respective diagonal fold line 64 and the end wall extension simultaneously raised. The raising of the end wall extension automatically positions the outer wall member vertically of the bottom panel whereupon the extension is folded on the score or fold line 53 for disposing the end wall top wall member or panel 57 horizontally of the carton bottom panel 25. The spacer flap 59 may now be folded to be at right angles to the end wall inner wall member or panel 58 whereupon the extension is folded on the score or fold line 54 for disposing the said inner wall member interiorly of the box or carton. The inwardly folding of the inner wall member 58 continues until the locking lugs 65 and 66 thereof snap into the side walls inner wall members locking slits 67 and 68.

The same steps are now gone through with the remaining end wall extension whereupon an erected box or carton with hollow upwardly extending walls from each side of the base or bottom panel results.

In practice, the box or carton after erected as above described has inserted therein the cake which is then passed for having the decoration, icing, frosting and the like, placed on its upper surface while in the box. It has been customary to place the cake on a piece of cardboard or the like prior to insertion or dispositioned within the box or container. This piece of cardboard is known as a cake liner and either fits relatively snugly within the box or carton, that is, has an area substantially equal to the area of the box as represented by its open top, or is of the area of the cake thereon. If the cake, for example, were round or circular in plan the cake liner may have the same area while if rectangular the cake liner would likewise be rectangular and of the same area. In each instance the transverse and longitudinal dimension of the cake liner have closely approximated the similar dimensions of the interior of the box or carton. This frequently resulted in slight damage to the cake during its insertion within the box or carton and very definitely gave the user difficulty in removing the cake from the box or carton without damaging the decoration on the cake. The boxed and decorated cakes are then wrapped in a transparent wrapping such as "Cellophane" and which wrapping is frequently done by an automatic machine.

In Fig. 4 there is illustrated a cake liner of the present invention which is particularly designed for use with round or circular cakes and which liner will permit the disposition of the cake within the box or carton without damage thereto and at the same time will enable the user to remove the cake from the box or carton even though the cake is of a dimension closely approximating the transverse and longitudinal dimension of the box or carton. Specifically, as shown in Fig. 4, the cake liner and lift comprises a body portion 70 substantially rectangular in area and closely approximating the area of the carton or box bottom exposed within the inner wall members with just sufficient clearance to permit the lowering of the liner-lift body into the box and its removal therefrom. Projecting from diagonal corners of the body 70 are arms 71 and 72 respectively integrally hingedly connected with the liner-lift body 70 by score or fold lines 73 and 74. The said arms 71 and 72 may be provided near their outer ends with openings 75 and 76, of any suitable or desirable configuration, and which act as finger holes when in use.

The cake is placed on the lift liner shortly after it is removed from the oven wherefore the cake is relatively soft. For the purpose of strengthening the lift liner body 70 as well as for providing a temporary anchoring means for the cake and lift-liner body 70, the said body 70 may be corrugated or ridged by corrugations running in a given direction or in crosswise directions, such as indicated at 77 and 78. The temporary anchoring of the cake to the lift liner is caused by the cake somewhat embedding itself in the corrugations or cross grooves 77 and 78.

In use the lift liner of Fig. 4 is shipped to the user in its extended condition and after having the cake deposited thereon the arms 71 and 72 are raised or folded on their score or fold lines 73 and 74 to upstand, or the lift-liner may be shipped to the user with its arms folded inwardly and which are raised prior to receiving the cake, whereupon by engaging the upper ends of the said arms at about the finger holes or openings 75 and 76 the cake may be lowered into the erected box or carton of Fig. 3.

Figs. 7 and 8 disclose a complete package and, as there shown, package a round cake illustrated in phantom lines at 79. It will be noted that the diameter of the cake closely approximates the transverse dimensions of the interior of the box and is of a diameter substantially equal to the longitudinal and transverse dimensions of the lift liner body 70. As will be seen the upstanding lift liner arms 71 and 72 are disposed in diagonal corners of the box wherefore ample space is provided between the said arms and the walls or corners of the box on one side of said arms together with ample space between the other side of said arms and the cake itself, wherefore the cake can be readily deposited within the box or carton prior to the top decorating thereof and may be readily removed by the ultimate user.

Fig. 8 illustrates the cake in its carton having decoration on its upper surface between phantom lines 80 and 81 and this figure along with Fig. 7 discloses the box or carton with its enclosed cake further enclosed in a wrapping indicated by phantom lines 82, thereby providing a finished package.

The cake liner-lift illustrated in Fig. 5 is an example of material saving since the lift arms 71' and 72' are cut from within the borders of the cake lift or liner body portion 70. The said arms 71' and 72', however, are respectively integrally hingedly connected with said body portion by the score or fold lines 73 and 74.

In practice the lift arms 71' and 72' are lifted from the body portion and either retained in a vertical position or folded outwardly before the cake is deposited on the said body portion 70, whereupon the said lift arms 71' and 72' are arranged as above set forth for the lift arms 71 and 72.

The modification of the cake liner-lift in Fig. 6 provides for a reinforcement of the lift liner body portion 70 when the lift arms are cut from the interior thereof. This reinforcement consisting of integrally hingedly connecting with the lift liner body portion along two longitudinal edges thereof through score or fold lines 83 and 84 reinforcing flaps 85 and 86. The reinforcing flaps 85 and 86 are adapted to be adhesively secured, through adhesive 87 and 88, respectively on the undersurfaces of the reinforcing flaps 85 and 86, to the undersurface of the liner-lift body portion 70. It being understood that the said reinforcing flaps 85 and 86 are respectively provided with adhesively free areas 89 and 90 where such flaps underlie the lift arms 71' and 72' so as not to be connected therewith.

Figure 9:
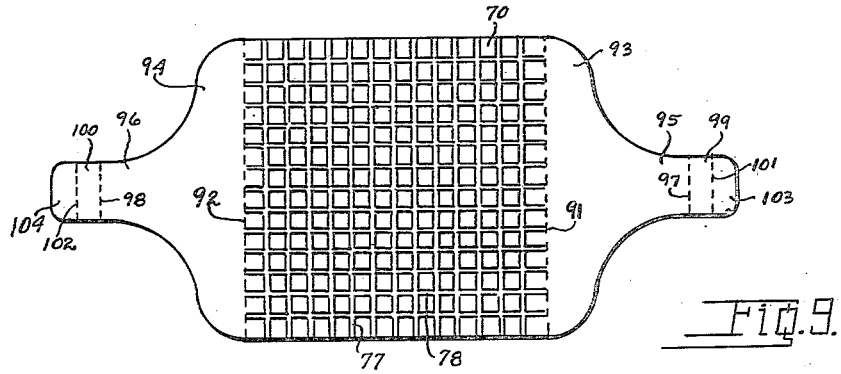
Fig. 9 is a plan view of a cake liner usable with cakes of rectangular area as distinguished from cakes of round area with which the liners of Figs. 4, 5 and 6 are particularly employed.

The foregoing description of the cake liner-lift is employed with round cakes while the liner-lift illustrated in Fig. 9 is adapted for use with cakes that are rectangular in plan and deposited within a box or carton having an interior dimension substantially equal to the area of the cake. As shown in Fig. 9 use is made of a reinforced or corrugated body portion 70 having the lift arms projecting from the two opposed sides thereof at points substantially midway thereof. Specifically this modification comprises integrally hingedly connecting with the liner-lift body portion 70 through score or fold lines 91 and 92, lift flaps 93 and 94 each of which terminates in substantially narrower lift arms 95 and 96. The left arms 95 and 96 have respectively integrally hingedly connected therewith through score or fold lines 97 and 98 lift fingers 99 and 100 which are in turn transversely scored at 101 and 102 to provide tucking or locking flaps 103 and 104 at each end of the lift arms, for a purpose subsequently to be made clear.

In the use of automatic wrapping machinery it will be appreciated that projecting portions of a package will interfere and it will also be appreciated that the lift arms 95 and 96 will be substantially sheathed by the carton or box walls and the adjacent side of the cake wherefore the arms 95 and 96 are provided with lift fingers adapted to be projected above the carton or box and cake when removing the same from the box and in order to insure the said lift fingers being available and yet locked or latched down during the wrapping of the package they are provided with the locking lugs 103 and 104. For this reason the carton blank of Fig. 1 is provided in its score or fold lines 32, substantially midway of their length, with a cut 105 which when the carton is erected opens up as a slit or slot down into the hollow wall inwardly of the outer wall members 35.

In practice and after the deposition of a cake on the body portion 70 of the cake liner-lift of Fig. 9 the lift flanges are upwardly disposed on their score or fold lines 91 and 92. The cake is then lowered in the box or carton and the lift fingers 99 and 100 outwardly folded on their score or fold lines 97 and 98 to lie on the carton side wall top wall members 36. The tucking flaps 103 and 104 were previously folded to be downwardly normal to the lift fingers and in positioning the said lift fingers on the carton or box side wall top wall members were inserted in the openings 106, see Fig. 10, resulting from the slits 105. The cake is now delivered to the decorator to have the top decoration applied thereto whereupon the package is then wrapped in the outer transparent wrapper all as illustrated in Fig. 11.

Figure 12:
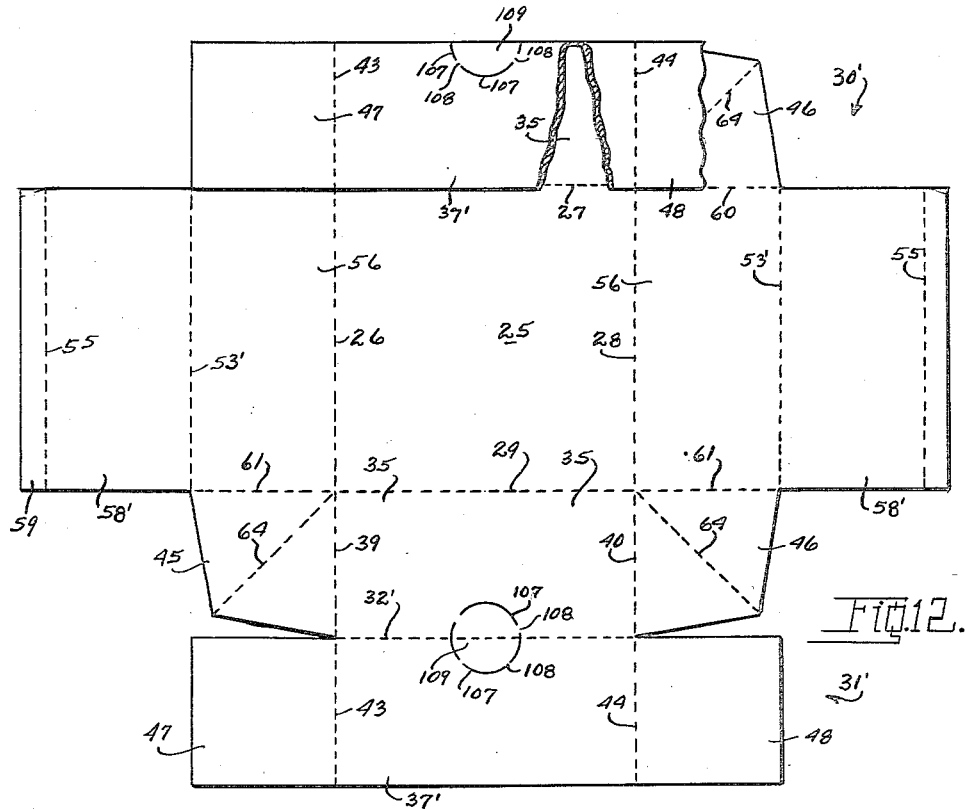
Fig. 12 is a view similar to Fig. 1 of a modified blank from which a modified carton may be erected and adapted to have employed therewith the cake liners or lifts of Figs. 4, 5 and 6.

The modified carton blank in Fig. 12 is modified over that in Fig. 1 only to the extent of eliminating from the box or carton the hollow walls, in other words eliminating the side walls top wall members or panels 36 and the end walls top wall members or panels 57 from the walls extensions 30' and 31'. There has also been eliminated from the side walls extensions the inner wall member glue flaps 38. The blank of Fig. 12 therefore comprises in the side wall extensions 31' the panels 35 forming the erected carton side wall outer wall members which have their upper edge defined by the score or fold lines 32' for integrally hingedly connecting therewith the side wall inner wall members or panels 37'. Each of the said side wall inner wall member 37' has integrally hingedly connected with its ends the tucking flaps 47 and 48 but which tucking flaps are devoid of spacer flaps 51 and 52.

In the modification in Fig. 12 the blank end wall extensions 30' each comprises the end wall outer wall member or panel 56 having its upper end defined by the score or fold line 53 which integrally hingedly connects therewith the end wall inner wall member or panel 58'.

It will be readily appreciated that the carton from the blank of Fig. 12 is erected in substantially the same manner as above described for erecting the carton from the blank of Fig. 1, since the side wall inner and outer wall members are merely folded on one another on the score or fold lines 32' and raised to be normal to the carton bottom panel 25. The tucking flaps 45 through 48 are then folded to be transversely of the carton bottom 25 whereupon the end wall flaps 56 and 58' are successively folded onto one another on the score or fold lines 53' for embracing the tucking flaps 45 through 48.

Figure 15:
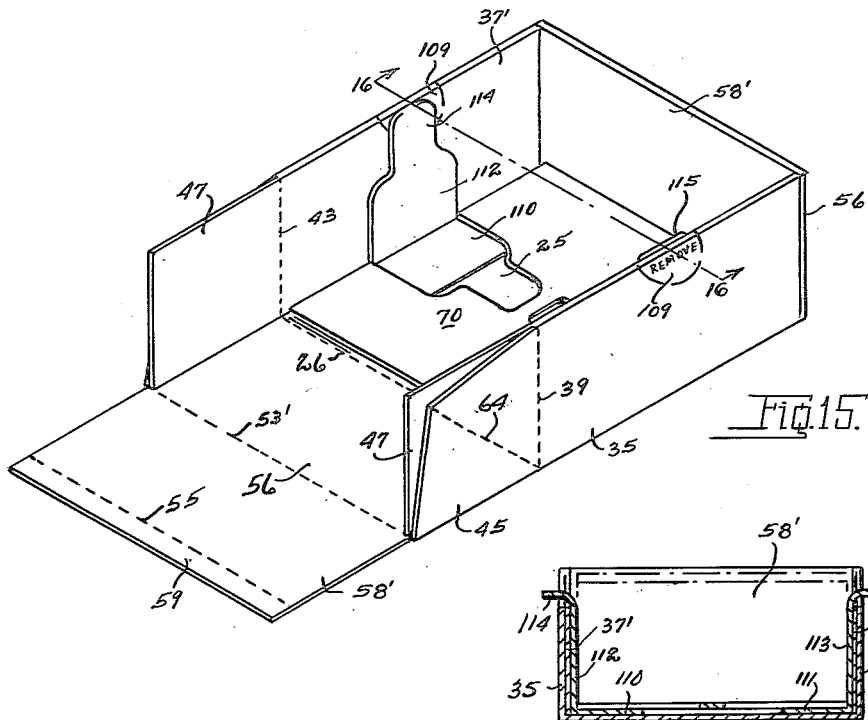
Fig. 15 is a perspective view of a partially erected box or carton from the blank of Fig. 12 having mounted therein a cake liner and lift of Fig. 13.

The erected carton is now in substantially the erected position illustrated in Fig. 15 and without further modification may be utilized for enclosing or packaging round cakes disposed on the cake liners or lifts as above described and illustrated in Figs. 4, 5 and 6. When a carton from the blank of Fig. 12 is employed with rectangular cakes it is preferably desirable to further modify the carton to afford an opportunity to engage the lift arms which would be disposed between the cake side and adjacent carton wall.

This further modification preferably consists in enabling the said carton side wall to have a portion thereof removed thereby exposing the cake liner-lift arms. As illustrated in Fig. 12 this modification consists in forming in each side wall extension 31' an interrupted cut of any suitable or desirable configuration, that shown in the drawings being substantially circular and including a plurality of arcuate cuts 107 with uncut portions 108 between adjacent ends of the cuts. This results in a plug like portion 109 of the blank that can be readily removed and discarded as will presently be made clear.

Figures 13, 14:
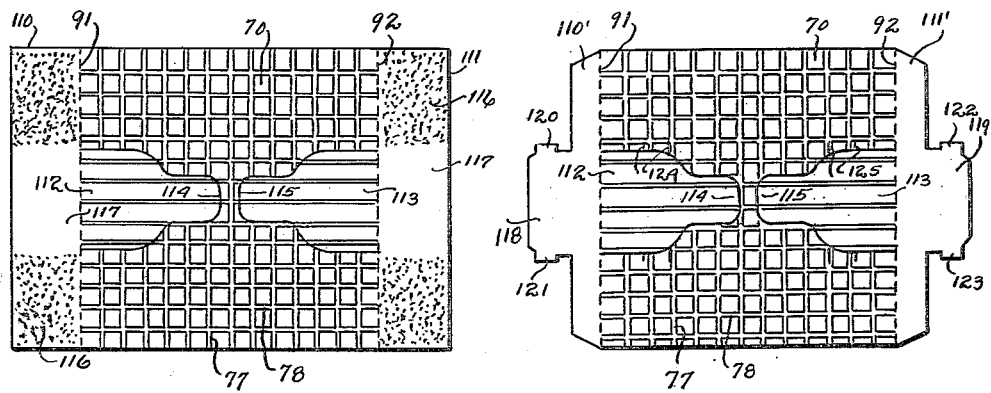
Fig. 13 is a plan view of a blank for providing a modified construction of a cake liner and lift particularly usable with the blank of Fig. 12.
Fig. 14 is a plan view of a cake lift and liner showing a modification therein.

With the modified carton of the blank of Fig. 12 and enclosing rectangular cakes, the cake liner-lift of Fig. 9 may be employed without however having integral therewith the lift fingers 99 and 100 or the tucking flaps 103 and 104, or the cake liner-lift as modified and illustrated in Figs. 13 and 14 may be employed. The liner illustrated in Fig. 13 comprises the body portion 70 defined at two of its opposed ends by the score or fold lines 91 and 92 which integrally hingedly connect therewith reinforcing panels 110 and 111. Interiorly of the bounds of the lift-liner body 70 there is formed lift arms 112 and 113 each of which terminates in a narrowed engaging portion or lift fingers 114 and 115. The blank of Fig. 13 after having the lift arms 112 and 113 cut, has adhesive 116 applied to the under surface of the panels 110 and 111 with each panel having a portion thereof 117 free of adhesive. The panels 110 and 111 are then turned to engage the under side of the body portion 70 for adhesive attachment thereto. It will be understood that the reinforcing panels 110 and 111 through their adhesive free portions 117 are not attached to the lift arms 112 and 113.

It is in this condition that the cake liner-lift of Fig. 13 is shipped to the user who upon desiring to use same, that is place a cake thereon, first raises the lift arms 112 and 113 to a position to be at least normal to the body portion 70.

Figure 19:
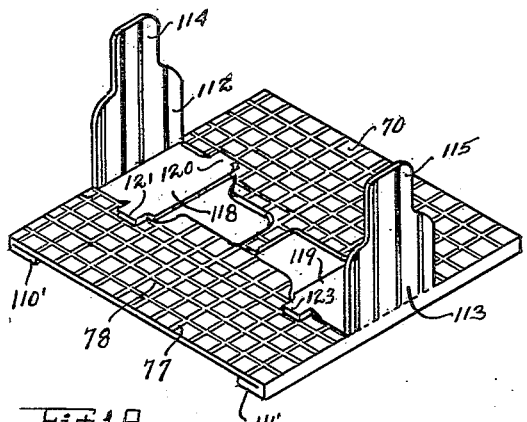
Fig. 19 is a perspective view of an erected cake liner and lift from the blank of Fig. 14.
Figure 16:
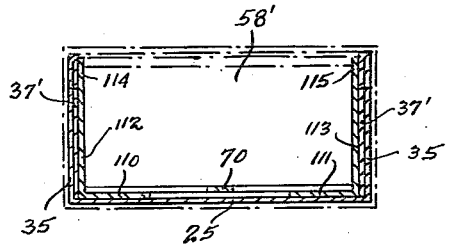
Fig. 16 is a transverse sectional view through an erected carton of Fig. 15 as seen from line 16—16 on said Fig. 15.
Figure 18:
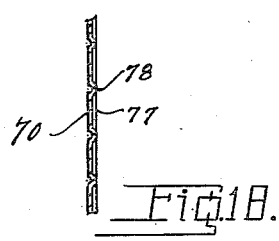
Fig. 18 is an enlarged fragmentary sectional view through a liner or lift illustrating the corrugation thereof which forms a detail of the invention, as seen from line 18—18 on Fig. 4, for example.

The modification in Fig. 14, illustrated in set up usable position in Fig. 19, is somewhat similar to Fig. 13 except that the reinforcing panels 110' and 111' are not adhesively attached to the under surface of the liner-lift body portion 70 but instead are merely interlocked in operative positions. The said interlock comprising tongues 118 and 119 respectively outwardly projecting from the panels 110' and 111'. The tongues 118 and 119 are each of a width substantially equal to the width of the lift arms 112 and 113 and said tongues 118 and 119 are each provided with a pair of laterally projecting locking ears; those projecting from the tongue 118 being indicated by reference numerals 120 and 121 while those projecting from the tongue 119 are indicated by reference numerals 122 and 123. As will presently be made clear and in order to facilitate locking the panels 110' and 111' in their reinforcing positions the liner-lift body portion 70 is provided laterally of each side of the openings resulting from the dieing out of the lift fingers 112 and 113 with short cuts, there being a pair of each cut on each side of each opening, those associated with the finger 112 opening being indicated by the reference numeral 124 while the cuts from the opening resulting from the finger 113 being indicated by the reference numeral 125.

The blank of Fig. 14 is shipped to the user in its extended position, as illustrated in Fig. 14, who upon desiring to use same first lifts the arms 112 and 113 from the plane of the liner-lift body portion 70, respectively on the fold or score lines 91 and 92. The panels 110' and 111' are then actuated about their respective fold or score line 91 or 92 through an arc of slightly more than 180 degrees which will cause the said panels 110' and 111' to engage the under surface of the liner-lift body portion 70 and at the same time project the tongues 118 and 119 through the lift arms openings. The said tongues 118 and 119 are each pushed through its respective opening from the under side of the body portion 70 until their respective locking ears 120 to 123 are above the said body portion 70. The openings lateral cuts 124 and 125 assisting in this operation. As soon as the said locking ears 120 to 123 are above the body portion 70 pressure is removed from the tongues 118 and 119 whereupon the said locking ears 120 to 123 engage the upper surface of the body portion 70 to retain the reinforcing panels 110' and 111' in operative positions. The lift fingers 112 and 113 are now in a position, at least, normal to the body portion of the lift-liner as clearly illustrated in Fig. 19. The user may now place the cake on the upper surface of the liner-lift body 70 to place the cake within the box or carton of Fig. 15.

Figure 17:
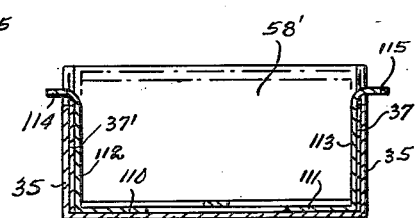
Fig. 17 is a transverse sectional view of the erected carton of Fig. 15, similar to Fig. 16, illustrating the same when used to remove a cake from the box or carton.

It will be noted that the lift arms 112 and 113 are substantially of the height of the carton side walls wherefore, see Fig. 17, the said arms are substantially sheathed by the carton side walls and the cake and are therefore inaccessible without damaging the cake. It is for this reason that the removable plug 109 is provided in the carton, and to inform the ultimate purchaser of the package of its purpose a suitable notation as "remove" or "tear out" may be printed thereon. The ultimate user upon removing the plug 109 will have exposed to view the upper, reduced portions or lift fingers 114 and 115 of the lift arms 112 and 113. The said reduced portions 114 and 115 are of a lesser transverse dimension than the removable plug 109 and may carry a suitable notation or instruction, such as "lift." The user will then engage said reduced portions of the lift arms 112 and 113 and automatically outwardly deflect or bend the same, as clearly illustrated in Fig. 17, whereupon an upward lifting of the liner-lift and cake may be effected for removing the same from the carton of Fig. 15.

Figure 11:
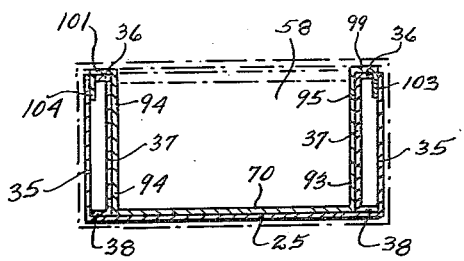
Fig. 11 is a transverse sectional view through Fig. 10 as seen from line 11—11 on said Fig. 10.

A substantially similar instruction or notation, "lift," may be applied to the lift finger portions 99 and 100 of the lift arms 95 and 96 of the form illustrated in Fig. 9 and which will be observable by the user since the said portions lie on the upper surface of the side walls top wall members, see Fig. 10.

From the foregoing, it will now be appreciated, that there has been provided a cake package which not only assists the baker or manufacturer of the cake in producing the same but also assists the ultimate purchaser and user of the finished cake in removing the same from the box or carton. It will be appreciated that cakes can be properly disposed in an enclosing box or carton which rather snugly engages the sides of the cake without damaging the cake and that the ultimate user can readily remove the cake from said box or carton without damage to either the cake or the top decorations thereon. It will also be appreciated that the other objects initially set forth have been attained.

What is claimed is:

1. As an article of manufacture a liner-lift formed from a single blank of card or paper board material comprising a body portion rectangular in area, and a pair of lift arms integrally hingedly connected with the body portion one transversely of each of two diametrical corners thereof, said integral hinge connection of each arm being formed inwardly of but adjacent to its corner, and said lift arms being cut from the body portion within the edges thereof and extending toward one another from their respective hinge connections.

2. As an article of manufacture a liner-lift formed from a single blank of card or paper board material comprising a body portion rectangular in area, a pair of lift arms integrally hingedly connected with the body portion one transversely of each of two diametrical corners thereof, said integral hinge connection of each arm being formed inwardly of but adjacent to its corner, and said lift arms being cut from the body portion within the edges thereof and extending toward one another from their respective hinge connections, and reinforcing panels integrally, hingedly, connected with two opposed edges of said body portion for underlying the said body portion inwardly of the edges of attachment, and means for securing the reinforcing panels in position.

3. In a package of the class described the combination with a deformable product, of a carton having a rectangular bottom with opposed end walls and opposed side walls upstanding from the edges thereof with their adjacent ends joined to form corners and within which said end and side walls the deformable product is disposed, a liner-lift including a rectangular body portion having a length and a width substantially equal to the corresponding dimensions of the carton bottom within its upstanding walls, said liner-lift body portion being adapted to receive the deformable product and position same on the carton bottom and within the carton walls, said deformable product being substantially circular in plan and having a diameter substantially equal to the dimensions between the opposed end and the opposed side walls of the carton, said liner-lift body portion having two opposite corners thereof formed as edges diagonally of the carton corners and with said edges outwardly of the deformable product, and a lift arm carried by the liner-lift body portion one at each of said two opposed diagonal edges upstanding from the liner-lift body portion to a height equal to the height of the carton walls and deformable product and with the edges of said lift arms adjacent to their respective side and end walls but inwardly of the carton corner.

4. In a packaging device of the class described for packaging cakes and the like, comprising a carton having a rectangular bottom with opposed side walls and opposed end walls upstanding from the edges thereof and with the adjacent ends of said walls connected to form substantially right angle corners, a cake liner-lift including a rectangular body portion of an area substantially equal to the area of the carton bottom within its upstanding walls with said liner-lift body portion having side and end edges substantially adjacent the carton side and end walls, said liner-lift body portion having two opposite corners thereof formed as edges diagonally of the carton corners, and a lift arm integrally, hingedly, connected to the liner-lift body portion diagonal edges and upstanding from the liner-lift body portion to a height above the carton bottom substantially equal to the height of the carton walls and with the edges of said lift arms adjacent to their respective side and end walls but inwardly of the carton corner.

5. In a packaging of the class described for packaging cakes and the like, comprising a carton having a rectangular bottom with opposed side walls and opposed end walls upstanding from the edges thereof and with the adjacent ends of said walls connected to form substantially right angle corners, a cake liner-lift including a rectangular body portion of an area substantially equal to the area of the carton bottom within its upstanding walls with said liner-lift body portion having side and end edges substantially adjacent the carton side and end walls, said liner-lift body portion having two opposite corners thereof formed as edges diagonally of the carton corners, said liner-lift body portion having the upper surface thereof corrugated, and a lift arm integrally, hingedly, connected by the liner-lift body portion diagonal edges and upstanding from the liner-lift body portion to a height above the bottom substantially equal to the height of the carton walls and with the edges of said lift arms adjacent to their respective side and end walls but inwardly of the carton corners.

References Cited in the file of this patent

UNITED STATES PATENTS

| Number | Name | Date |
|---|---|---|
| 692,618 | Carr | Feb. 4, 1902 |
| 1,680,539 | Hadi | Aug. 14, 1928 |
| 1,927,435 | Derst | Sept. 19, 1933 |
| 1,944,305 | Schmidt | Jan. 23, 1934 |
| 1,950,265 | Peterson | Mar. 6, 1934 |
| 1,969,195 | Archer | Aug. 7, 1934 |
| 2,010,118 | Tarboy | Aug. 6, 1935 |
| 2,030,349 | Bradley | Feb. 11, 1936 |
| 2,109,955 | Carson | Mar. 1, 1938 |
| 2,138,005 | Hershey | Nov. 29, 1938 |
| 2,533,997 | Cochrane | Dec. 12, 1950 |